United States Patent Office 2,935,611
Patented May 3, 1960

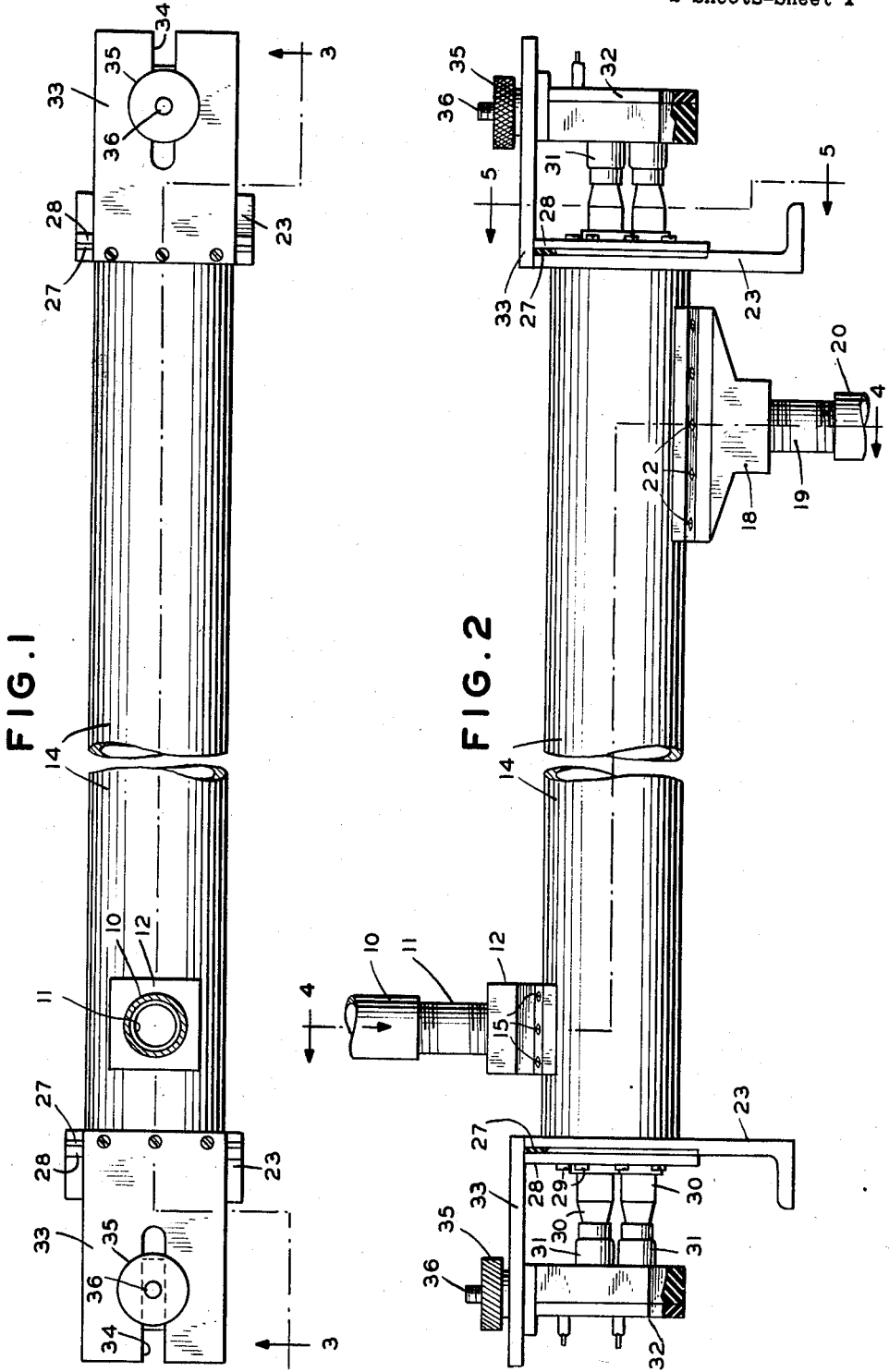

2,935,611

ULTRA-VIOLET STERILIZATION APPARATUS

Raymond F. Myers, Chappaqua, N.Y., assignor to Corn Products Company, a corporation of Delaware Application July 26, 1957, Serial No. 674,477

3 Claims. (Cl. 250—49)

This invention relates to apparatus for the sterilization of fluids and more particularly to apparatus for the sterilization of liquids including viscous syrups or aqueous solutions of sugar by means of ultraviolet radiation.

Sterilization of liquids by means of ultraviolet radiation is common in the art. However, the efficiency of the sterilization process may be affected by a number of factors which include the age or intensity of the ultraviolet ray generating tube, the proximity of the liquid to the source of ultraviolet radiation, the number of times a given amount of liquid is caused to pass the source of ultraviolet radiation and the film thickness of the liquid when it is being irradiated.

It has been found that commercial ultraviolet ray generating tubes normally deteriorate and suffer a serious loss in intensity in about four months. Thus it is necessary to provide means whereby the ultraviolet ray tubes may be easily and quickly replaced. Furthermore, the ultraviolet ray tubes are inherently fragile so it is desirable to provide protection for the said tubes.

The liquid to be sterilized by ultraviolet radiation is affected not only by the direct radiation from the ultraviolet ray generating tube but also by reflected radiation. The efficiency of the sterilization apparatus may, therefore, be increased by providing means adjacent to the ultraviolet ray tubes which reflect the maximum amount of radiation.

It is an object of the present invention to provide an apparatus for the continuous sterilization of liquids in which the ultraviolet ray generating tubes may be easily and quickly replaced without dismantling the sterilization apparatus and which provides a means of protection for said tubes.

It is also an object of the present invention to provide an ultraviolet sterilization apparatus which is designed to utilize reflected radiation for sterilization as well as direct radiation for this purpose.

A further object of this invention is to provide an ultraviolet sterilizing apparatus in which the liquid to be sterilized is passed through a controlled space in a tortuous path and must pass at least two ultraviolet ray tubes.

A still further object of this invention is to provide an ultraviolet sterilization apparatus having means whereby breakage of any of the protective tubes surrounding the ultraviolet ray tubes will stop the flow of the liquid being sterilized or cause a warning signal to be actuated or both.

In accordance with this invention there is provided a sterilizer housing made of reflecting material and having inlet and outlet ports arranged adjacent to the ends of the housing and located on opposite sides of the housing. A plurality of ultraviolet ray tubes are located in spaced relation inside the sterilizer housing and each of the ultraviolet ray tubes is surrounded by a protective tube transparent to ultraviolet radiation. These protective tubes also provide for thermal insulation of the ultraviolet tubes and thus permits them to operate at their most effective temperature.

In accordance with a further feature of this invention the transmission tubes substantially transparent to ultraviolet radiation surrounding the ultraviolet ray generating tubes are provided with a metal, preferably silver, electrical conducting foil strip mounted lengthwise in the tube so that upon breakage of the transmission tube, electric circuit means are actuated thereby stopping the flow of liquid through the sterilizer or causing a warning signal to be actuated or both.

Further objects and advantages of this invention will be apparent from the following description and the accompanying drawings in which:

Figure 1 is a plan view of a sterilizer apparatus in accordance with the present invention;

Figure 2 is an elevation partly in section of a sterilizer apparatus in accordance with the present invention;

Figure 3:
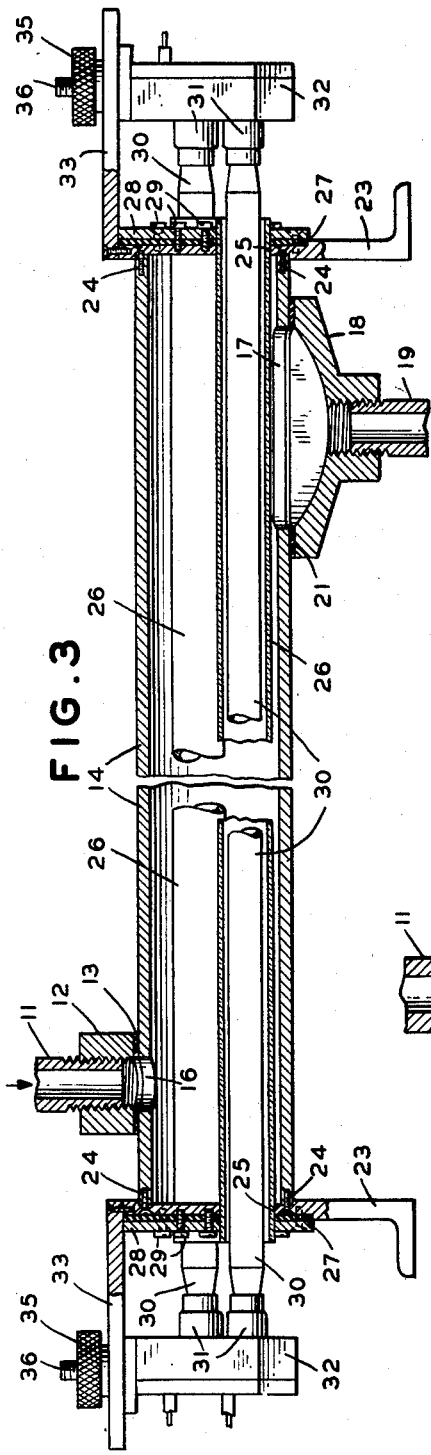
Figure 3 is an elevation taken along line 3—3 of Figure 1.
Figure 4:
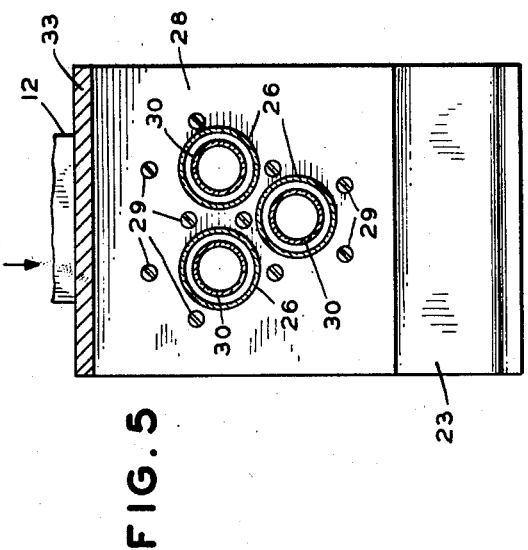
Figure 4 is a section taken along line 4—4 of Figure 2.
Figure 5:
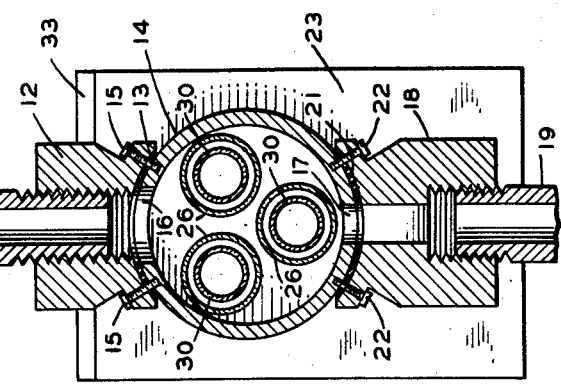
Figure 5 is a section taken along line 5—5 of Figure 2.

Referring now to the drawings which describe one preferred form of apparatus in accordance with the present invention, the liquid or fluid to be sterilized enters the inlet port 16 of the sterilizer housing 14 from the inlet conduit 10 threadedly connected to a nipple 11 which in turn is threaded into the inlet port adapter 12. A gasket 13 separates the inlet port adapter 12 from the sterilizer housing 14 and provides a liquid tight connection between the inlet port adapter 12 and the sterilizer housing 14. The inlet port adapter 12 is fastened to the sterilizer housing 14 by cap screws 15. The outlet port 17 of the sterilizer housing 14 is located adjacent to the end of the sterilizer housing opposite to the inlet port 16 and is in the form of a slot with its major axis parallel to the sterilizer housing 14. Sterilized liquid passes through the outlet port 17 and thence through the outlet port adapter 18 and nipple 19 to the outlet conduit 20. A gasket 21 separates the outlet port adapter 18 from the sterilizer housing 14 and provides a liquid tight connection between the outlet port adapter 18 and the sterilizer housing 14. The outlet port adapter 18 is fastened to the sterilizer housing 14 by cap screw 22. The sterilizer housing 14 is shown in the drawings as a cylindrical tube although it may also take other geometric forms so that its cross-section may be triangular, square, hexagonal, etc. In the present embodiment, the sterilizer housing 14 is made of aluminum since this material is readily machineable and is a good reflector of ultraviolet radiation in the range of about 2500 A, the range which is most effective for purposes of sterilization by ultraviolet radiation. Other materials, and particularly other metals, such as chromium, may also be used although chromium is less effective as a reflector of ultraviolet radiation in the critical range referred to above.

A bracket 23 is attached to each end of the sterilizer housing 14 by means of cap screws 24 which are countersunk into the brackets 23. The brackets contain spaced apertures 25 through which pass transmission tubes 26 which are substantially transparent to ultraviolet radiation. The transmission tubes 26 may be made of fused quartz or other material which is substantially transparent to ultraviolet radiation such as "Corex D" glass manufactured by the Corning Glass Company. Gaskets 27 made of nylon or other suitable material and containing apertures corresponding to the apertures 25 in the brackets 23 are located on the outside surface of the brackets 23 and held in sealing position against the transmission tubes 26 by means of plates 28 which contain similar registering apertures and which are fastened to the brackets 23 by a plurality of cap screws 29.

The ultraviolet transmitting tubes 26 and the sterilizer housing 14 are of such sizes that when assembled in accordance with this invention the minimum distance between any two of the transmission tubes 26 as well as the minimum distance between any of the transmission tubes 26 and the sterilizer housing 14 is approximately 1 to 4.5 mm., preferably about 3 mm. Therefore, the liquid during the process of sterilization is required to pass in a relatively thin film and in a tortuous path between at least two pairs of ultraviolet ray generating tubes or between at least two pairs of elements comprising an ultraviolet ray generating tube and a reflecting surface. A silver foil strip (not shown) is mounted on the inside surface of each of the transmission tubes 26. The silver foil strip is connected to an electrical circuit which actuates a valve (not shown) located in the inlet conduit 10. In the event that one of the transmission tubes 26 is cracked or broken for any reason, the silver foil strip will be severed, thus interrupting the electrical circuit and causing the valve to close. The electric circuit means may additionally or in the alternative actuate a warning signal which may be of the visual or audible type.

Ultraviolet ray generating tubes 30 of commercial design are located within the transmission tubes 26. The ends of the ultraviolet ray generating tubes 30 are connected to suitable electrical sockets 31 which are spring mounted in connector blocks 32 made of suitable insulating material. The connector blocks 32 are slidably mounted on connector block plates 33 which are attached to the brackets 23. The connector blocks 32 slide in a slot 34 cut in the connector block plate 33 which slot extends to the outer edge of the plate. A knurled lock nut 35 mounted on a screw 36 fixed in the connector block 32 is provided to permit the lateral adjustment of the connector blocks 32 and to permit the removal of the connector blocks 32 from the connector block plates 33 when the ultraviolet ray generating tubes 30 are replaced.

The sterilizer apparatus made in accordance with this invention is desirably mounted so that the axis of the sterilizer housing 14 is horizontal and the inlet and outlet conduits are vertical, the inlet conduit 10 being located on the top of the sterilizer housing 14 and the outlet conduit 20 being located on the bottom of the sterilizer housing 14. However, this arrangement is optional and other arrangements are feasible. During operation the liquid to be sterilized enters the sterilizer housing 14 at the inlet port 16, passes by gravity in a tortuous path between pairs of ultraviolet ray transmitting tubes 26 or between such tubes and the walls of the sterilizer housing 14, and then leaves the sterilizer housing 14 at the outlet port 17. In the event that the viscosity of the liquid to be sterilized is high or a more rapid flow of liquid is desired, pumps of commercial design may be installed at appropriate points in the system so that the pressure head at the inlet port of the sterilizer housing is maintained at the desired level.

It will be appreciated that the length of the sterilizer housing 14 is desirably determined by the length of the ultraviolet ray generating tubes 30 which are commercially available. In the above described embodiment three ultraviolet ray generating tubes are utilized. However, varying numbers of such tubes may be used as desired so long as the appropriate spacing between the ultraviolet ray transmitting tubes 26 and between such a tube 26 and the wall of the sterilizer housing 14 is maintained. It is apparent that as the number of ultraviolet ray generating tubes 30 is increased, the number of times a given amount of liquid is required to pass in close proximity to an ultraviolet ray generating tube is also increased. Therefore, the sterilizing capacity and efficiency of the apparatus may be increased by increasing the number of ultraviolet ray generating tubes. In the event that it is not desirable to use a large number of such tubes in a single unit, several units of the type hereinbefore described may be connected in series, in parallel, or in a combination of series and parallel connections. It is apparent that the capacity of the system is increased when sterilizer units in accordance with the present invention are connected in parallel while the degree of sterilization may be increased when sterilizer units in accordance with the present invention are connected in series. Thus, the use of a system including several sterilizing units arranged in a combination of series and parallel connections with suitable valves and bypasses provides an extremely flexible system for sterilization of various types of liquids under varying circumstances. Furthermore, with such a system individual sterilizing units may be shut off for tube replacement or other maintenance without halting the entire process.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

What is claimed is:

1. An ultraviolet sterilization apparatus for the sterilization of liquids, comprising an elongated housing having inlet and outlet ports through which liquid to be sterilized may be passed, a plurality of transmission tubes substantially transparent to ultra-violet radiation located in closely spaced relation within and substantially parallel to said elongated housing, each of said transmission tubes having mounted on the inside surface thereof a foil strip of conducting material and electric circuit means connected to the ends of each of the said foil strips whereby upon fracture of any of the said transmission tubes the said foil strip mounted therein is severed and the said electric circuit means is interrupted, sealing means adapted to close the ends of the said housing and cooperate in sealing engagement with the outside surface of said tubes near the ends thereof, slidably adjustable connector means removably attached to said sealing means mounted at the ends of said elongated housing, ultraviolet ray generating means located within and substantially parallel to each of said transmission tubes by said slidably adjustable connector means which may be easily removed thereby facilitating the removal of said ultraviolet ray generating means from said elongated housing without dismantling said housing, sealing means and transmission tubes providing physical protection for said ultraviolet ray generating means when the apparatus is in assembled condition.

2. An ultraviolet sterilization apparatus for sterilizing liquids, comprising an elongated housing having inlet and outlet ports through which liquid to be sterilized may be passed, said elongated housing having an inner surface capable of reflecting ultraviolet radiation, a plurality of transmission tubes substantially transparent to ultraviolet radiation located in closely held spaced relation within and substantially parallel to said elongated housing and to each other so as to permit only a relatively thin film of liquid to pass between said housing and said tubes, sealing means closing the ends of said elongated housing and providing sealing engagement with the outer surface of said transmission tubes near the ends thereof, slidably adjustable connector means removably attached to said sealing means mounted at the ends of said elongated housing, ultraviolet ray generating means located within and substantially parallel to each of said transmission tubes by said slidably adjustable connector means which may be easily removed thereby facilitating the removal of said ultraviolet ray generating means from said elongated housing without dismantling said housing, sealing means and transmission tubes, said transmission tubes providing physical protection for said ultraviolet ray generating means when the apparatus is in the assembled condition.

3. An ultraviolet sterilization apparatus for sterilizing liquids, comprising an elongated housing having inlet and outlet ports through which liquid to be sterilized may be passed, said elongated housing having an inner surface capable of reflecting ultraviolet radiation, a plurality of transmission tubes substantially transparent to ultraviolet radiation located in closely spaced relation within and substantially parallel to said elongated housing and to each other, whereby said parallel located transmission tubes and housing are positioned in such closely-spaced relationship to one another as to permit only a relatively thin film of liquid to pass between them, each of said tubes having mounted on the inside surface thereof a strip of electrical conducting material, sealing means closing the ends of said elongated housing and providing sealing engagement with the outer surface of said tubes near the ends thereof, ultraviolet ray generating means located within and substantially parallel to each of said tubes, and electric circuit means connected to said electrical conducting strip whereby fracture of said electrical conducting strip as a result of the breakage of said tube produces a warning signal.

References Cited in the file of this patent

UNITED STATES PATENTS

| | | |
|---|---|---|
| 1,670,217 | Scheidt | May 15, 1928 |
| 1,896,379 | Ross | Feb. 7, 1933 |
| 2,051,395 | Robinson | Aug. 18, 1936 |
| 2,340,890 | Lang et al. | Feb. 8, 1944 |
| 2,504,349 | Prieto | Apr. 18, 1950 |
| 2,667,584 | Rhodes | Jan. 26, 1954 |
| 2,670,439 | Darney | Feb. 23, 1954 |
| 2,738,427 | Wagnon | Mar. 13, 1956 |
| 2,857,520 | Van Wilgen | Oct. 21, 1958 |